Figure 1:
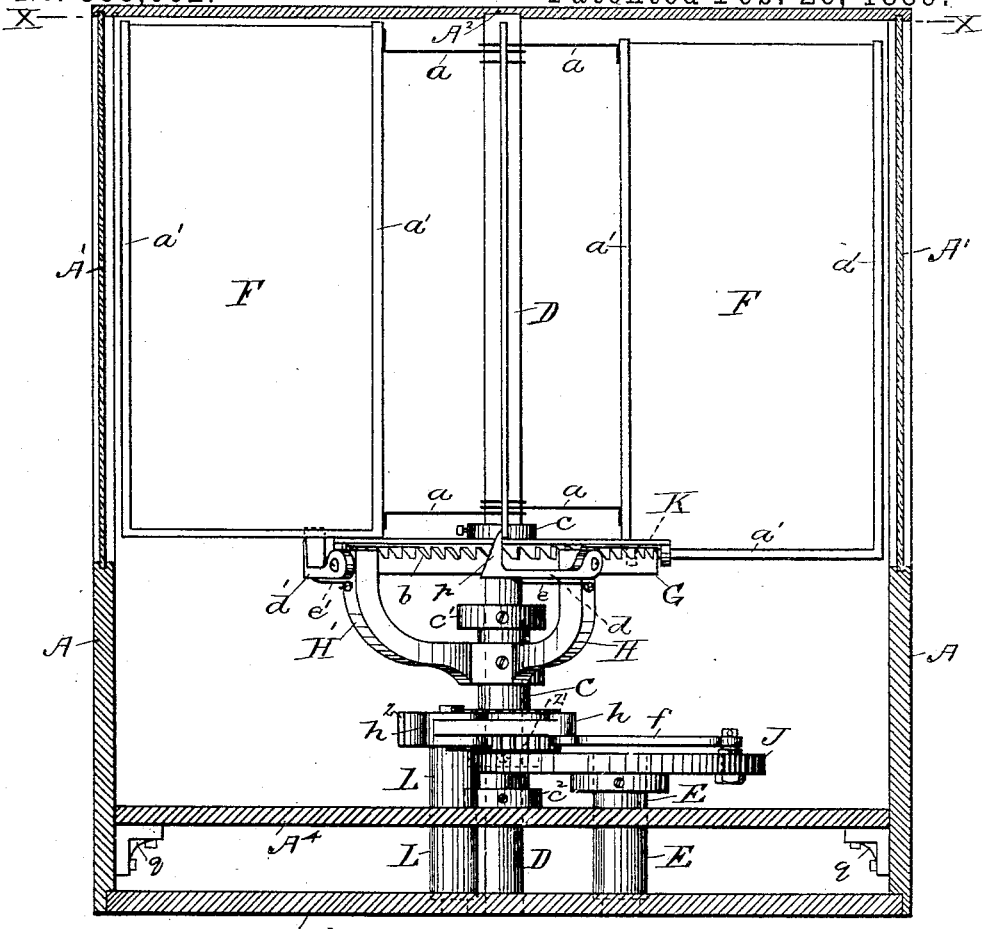

(No Model.) 2 Sheets—Sheet 1.

E. FLETCHER.
EXHIBITING OR ADVERTISING DEVICE.

No. 398,602. Patented Feb. 26, 1889.

WITNESSES.
Frank H. Parker
John W. Sanger

INVENTOR.
Elmer Fletcher
by Bowdoin S. Parker
his atty.

(No Model.) 2 Sheets—Sheet 2.

E. FLETCHER.
EXHIBITING OR ADVERTISING DEVICE.

No. 398,602. Patented Feb. 26, 1889.

WITNESSES.
Frank H. Parker.
John W. Sanger.

INVENTOR.
Elmer Fletcher
By Bowdoin S. Parker
his Atty.

UNITED STATES PATENT OFFICE.

ELMER FLETCHER, OF NEEDHAM, ASSIGNOR OF ONE-HALF TO ISAAC M. HALL, OF BOSTON, MASSACHUSETTS.

EXHIBITING OR ADVERTISING DEVICE.

SPECIFICATION forming part of Letters Patent No. 398,602, dated February 26, 1889.

Application filed April 4, 1888. Serial No. 269,550. (No model.)

*To all whom it may concern:*

Be it known that I, ELMER FLETCHER, of Needham, in the county of Norfolk and State of Massachusetts, have invented a certain new and useful Improvement in Exhibiting or Advertising Devices, of which the following, taken in connection with the accompanying drawings, is a specification.

In the drawings like letters of reference indicate corresponding parts.

Figure 2:
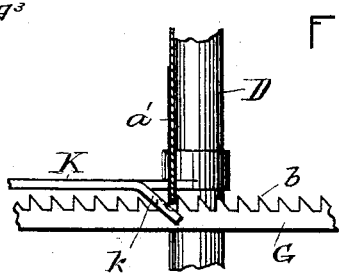
Figure 3:
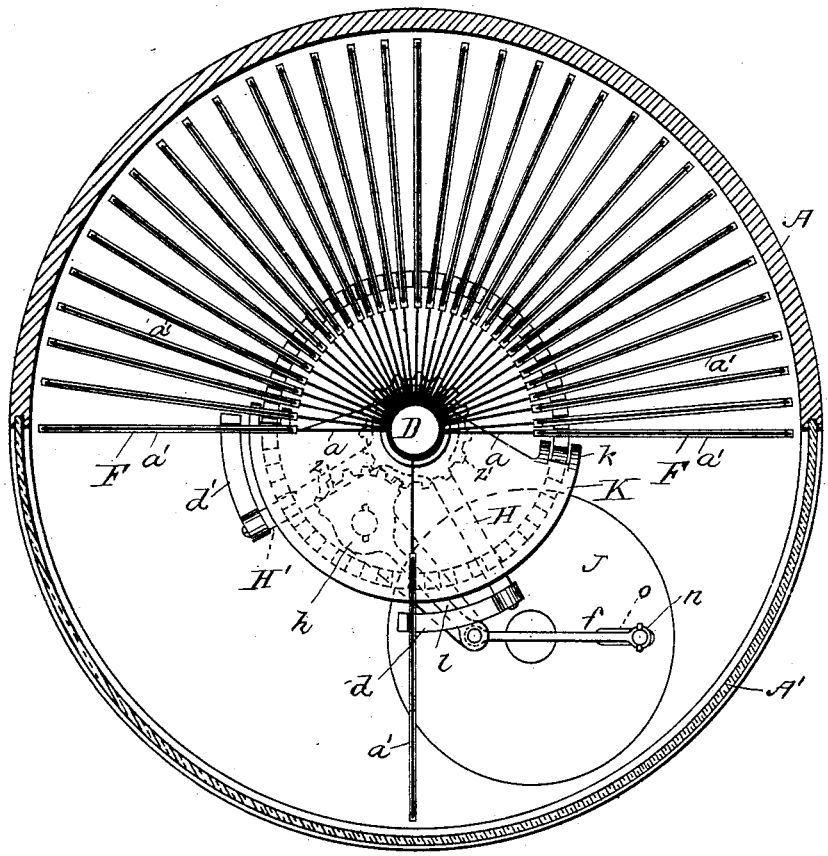
Figure 4:
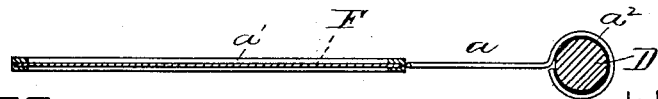

Figure 1 is a vertical section representing the several parts of the device upon a central line of the box or frame, one-half of which is supposed to be removed. The said box or frame is preferably made circular. Fig. 2 represents a portion of the device in elevation. Fig. 3 represents a sectional view of the several parts of the device upon the line $x\ x$ of Fig. 1. The several parts which operate the principal devices and which are placed underneath are represented in Fig. 3 by dotted lines, the front elevation of which is shown in Fig. 1. Fig. 4 represents one of the connecting-rods detached.

The special object of my present invention is to provide a novel and attractive automatic exhibiting or advertising device, and to this end I make the circular box A, having the bottom $A^3$ and the top $A^2$, which is preferably made removable. The upper portion of the box A is made or fitted with glass, A', in order that the advertisements or other matter exhibited may be clearly seen. This glass portion A' may be placed around the whole circumference of the box; but in use it will be found unnecessary to have more than the front half of the box of glass, as represented in Fig. 3. Within the said box I place the vertical shaft D, extending from the top to near the bottom of the box or frame. To this shaft are secured the rods $a$, each being formed as shown in Fig. 4, at $a\ a^2$, and adapted to fit loosely upon the said shaft, in order that they may be revolved around it, as hereinafter described. To the said rods $a$ are attached the frames $a'$. The frames and rods may be made integral, if desired. The frame $a'$ is adapted to hold the picture, advertisement, or other matter, (represented by F.) I form in the manner already described upon the shaft D a series of these rods and frames, all adapted to be rotated around the said central shaft. The connecting-rods $a$ are so placed in relation to each other as to allow a slight movement upward or downward, the said rods sliding up and down the said shaft, for the purposes hereinafter described. Underneath the bottom of these series of frames and rods I place a collar, G, having upon its upper surface notches $b$. This collar I preferably secure to the shaft D by the small band $c$ and a set-screw; but it may be loose and revolve around the shaft. Below this said collar G is placed upon the shaft D the sleeve C, which is adapted to be moved upon the said shaft. Near the top of this sleeve are attached the arms H and H', and to the top of each arm is secured a finger, $d\ d'$, each supported by a spring, $e\ e'$. The outer end of these fingers is made beveling and substantially of the form shown in Fig. 1 at $p$. I do not, however, confine myself to the precise form of finger shown, nor to the spring, as the fingers may be made of such a material as to have sufficient pliability and stiffness to be used for the purpose intended without the aid of an auxiliary spring. Over the front half of the collar G is placed a shield, K, terminating at each end with the bevel $k$, as shown in Fig. 2.

The devices above described are operated by any convenient power applied to the wheel J, Fig. 3. Attached to said wheel is the lever $f$, forming in effect a pitman, by which the lever $h$ is moved backward and forward upon each revolution of the pulley J. Upon the inner end of the lever $h$ is formed a sectional gear, $z$, which meshes in and turns the gear-wheel $z'$, which in turn is attached to the sleeve C upon the lower end of the shaft D. These various parts thus described are clearly shown in Fig. 3, and will be readily understood in connection with Fig. 1.

I do not confine myself to the particular device connecting the power with the sleeve C, as described, for any similar device or combination of devices to convey the motion of the wheel J to the sleeve C could be employed, and this might be done without the intervention of the said gear. In other words, the levers could be connected directly to the said sleeve, but it would not operate so advantageously.

Having now described the principal parts of my machine, I will proceed to more fully describe its manner of operation. As represented in Fig. 3, one of the frames is designed to be always standing directly to the front, as shown in Fig. 3. In this position the matter upon each side of said frame will be visible; also, the front of the frame upon the left-hand side and the back or reverse of a frame will be seen upon the right-hand side, so that there will always be exhibited the same as four sides of a frame, and each of these sides may be covered with different advertising-matter or with different pictures, as desired. Now, upon a revolution of the wheel J the lever $h$ will be moved back and forth, carrying backward and forward the sleeve C, and the sleeve in turn will carry backward and forward the arms H and H', and these in turn will move the fingers $d$ and $d'$ back and forth around the said shaft D. The movement is so arranged that these arms and fingers will be moved exactly a quarter of a circle in each revolution of the wheel J. When the fingers are moved to the left, they will pass under two of the frames, to wit: one will seize the frame standing directly to the front and the other will seize the frame first standing at the left, the bevel upon the end of the finger passing under the frame and said finger being supported by the spring attached to the same. It will be observed that the lower edge of each of the frames rests in one of the notches $b$, so that whenever the collar G is moved around or with the shaft D the frames are also revolved. Supposing, now, that the fingers had each seized its frame, as described, by the revolving of the sleeve C the arms and fingers would also be turned one-quarter way around and would carry with them each of the two frames to which they were hooked. By referring to Fig. 2 the use of the shield K will be understood, as when the left-hand finger seizes its frame, as required, and moves it around, the frame will slide up the end of the shield K upon the incline $k$, each end of the shield K having an incline, $k$, and while the frame is thus being moved around will rest upon the top of said shield K. As to the operation of the other finger, it grasps or seizes the bottom of the frame, as shown in Fig. 1, said frame at the time resting upon the top of said shield K. Now, when the said right-hand arm and finger are moved around toward the right they will carry with them the frame to which said finger is attached. When the latter frame has arrived nearly at its outer position at the right hand, it will slide off the end of the shield K, down the incline $k$, as represented in Fig. 2, and said movement of the arm and finger in completing the full quarter movement will also move the collar G slightly, and this movement of the collar will of course move all of the frames resting in all of the notches forward one notch. It will be seen that this movement of the collar must take place as soon as the right-hand frame slides down the incline sufficiently to engage one of the notches at the end of the incline $k$ of the shield K.

The rods $a$ are placed upon the shaft D a little distance apart in order to permit of this movement of the frame up and down, made necessary by being drawn out of the notches upon the shield, and also to permit them to drop when sliding off from the opposite end of the shield upon the right hand.

I do not confine myself to any special shaped box or case, nor to any particular arrangement of the several actuating devices within the box, as all of these matters are incidental and not of the essence of my invention. Neither do I confine myself to two arms and two fingers, as one or more may be advantageously employed. In case but one were used the sleeve C would be moved half the circle instead of one-quarter, as hereinbefore described with two, and one frame would be revolved from the left to the right each time instead of two frames one-quarter of the circle.

Having fully described my invention, what I desire to secure by Letters Patent of the United States, is—

1. In an advertising or exhibiting device, the combination of the box A, vertical shaft D, connecting-rod $a$, frames $a'$, arms H H', fingers $d$ $d'$, suitably supported by the springs $c$ and $c'$, the collar G, provided with the notches $b$, the said collar being placed under the said frames, and the shield K, placed over the said collar to support the frame during a portion of each revolution, and the sleeve C, arranged to actuate the said arms, all adapted to be operated substantially as and for the purposes set forth.

2. In an advertising or exhibiting device, the sleeve C, provided with the gearing $z'$, the actuating-gear $z$, working in gear $z'$, and the lever $h$, connected with the gear $z$, the crank $f$, attached to the said lever, and the wheel J, arranged to form a pitman, all combined and adapted to impart an oscillating motion to the arms H and H', substantially as and for the purposes set forth.

In testimony whereof I have signed my name to this specification, in the presence of two subscribing witnesses, on this 26th day of March, A. D. 1888.

ELMER FLETCHER.

Witnesses:
BOWDOIN S. PARKER,
A. C. THOMPSON.